United States Patent [19]

Baumeister

[11] Patent Number: 4,811,116
[45] Date of Patent: Mar. 7, 1989

[54] VIDEO RECORDER USING EXTENDED TAPE TRACKS TO RECORD COMPRESSED CHROMINANCE

[75] Inventor: Hans-Peter Baumeister, Churchville, N.Y.

[73] Assignee: Eastman Kodak Company, Rochester, N.Y.

[21] Appl. No.: 210,135

[22] Filed: Jun. 10, 1988

Related U.S. Application Data

[63] Continuation of Ser. No. 917,871, Oct. 10, 1986, abandoned.

[51] Int. Cl.⁴ .............................................. H04N 9/80
[52] U.S. Cl. .................................... 358/310; 358/343; 360/19.1; 360/22; 360/33.1
[58] Field of Search ............... 358/310, 320, 330, 335, 358/341, 343, 906; 360/9.1, 18, 19.1, 22, 24, 33.1

[56] References Cited

U.S. PATENT DOCUMENTS

| | | |
|---|---|---|
| 3,781,463 | 12/1973 | Van den Bussche . |
| 4,009,331 | 2/1977 | Goldmark et al. ................. 358/310 |
| 4,079,426 | 3/1978 | Umeda et al. ......................... 360/55 |
| 4,442,461 | 4/1984 | Shirai et al. ......................... 358/343 |
| 4,473,850 | 9/1984 | Foerster et al. ..................... 360/9.1 |
| 4,477,844 | 10/1984 | Nakano et al. . |
| 4,575,772 | 3/1986 | Shimada et al. .................. 360/18 X |
| 4,583,132 | 4/1986 | Nakano et al. ..................... 358/341 X |
| 4,608,609 | 8/1986 | Takano et al. .................. 358/310 X |
| 4,613,908 | 9/1986 | Takahashi et al. .................. 358/310 |
| 4,613,912 | 9/1986 | Shibata et al. .................. 358/341 X |
| 4,630,132 | 12/1986 | Terada et al. ........................ 358/310 |

Primary Examiner—Alan Faber
Assistant Examiner—W. R. Young
Attorney, Agent, or Firm—Robert M. Wallace

[57] ABSTRACT

In a video recorder having a drum with opposing dual record heads, successive fields of only the luminance signal (without the chrominance signal) are recorded by the heads during successive head rotations through 180°. The tape is overwrapped around the drum by a certain angle (over 216°, for example) so that the chrominance signal of each preceeding field may be compressed and recorded during each head rotation through the overwrap angle (i.e., from 180° to 216° in the example). Because the luminance signal is not mixed with the chrominance for recording (as has been usual), the luminance bandwidth may be increased by about 1 megaHertz to occupy the frequency band otherwise occupied by the color-under chrominance signal in the prior art. This provides a significant improvement in overall video image resolution.

14 Claims, 3 Drawing Sheets

VIDEO RECORDER USING EXTENDED TAPE TRACKS TO RECORD COMPRESSED CHROMINANCE

This is a continuation of application Ser. No. 917,871, filed Oct. 10, 1986 now abandoned.

BACKGROUND OF THE INVENTION

1. Technical Field

The invention is related to helical scan video tape recorders, and particularly to 8mm video cassette recorders or camcorders adapted to perform high resolution video recording for professional use.

2. Description of Related Art

Typically, video cassette recorders include a head drum supporting two opposing recording heads which record video signals on a magnetic tape helically wrapped at least 180° around the periphery of the drum. During video recording, the tape is transported linearly while the drum rotates. In order to protect the chrominance signal from high frequency distortions characteristic of magnetic recording, the chrominance signal is separated from the luminance signal and downshifted to a so-called "color-under" frequency band lower than that occupied by the luminance signal. The frequency band of the luminance signal is restricted in order to keep it separate from the "color-under" chrominance band.

2. Discussion Related to the Problem

Playback image resolution is determined mainly by the bandwidth of the luminance signal. Without the use of comb filters, the luminance bandwidth must be limited in order to make room for the color-under chrominance band, and this, in turn, limits the playback image resolution, an undesirable but well-known result. Thus, there is a need in the art to improve the playback image resolution, particularly in professional or industrial applications.

SUMMARY OF THE INVENTION

Solution to the Problem

Significant enhancement of playback image resolution is achieved in accordance with the invention by recording the luminance signal by itself, without being mixed with the chrominance signal, so that the luminance bandwidth need not be cut off to make room for the color-under chrominance signal. In most applications, this increases the luminance bandwidth by about 1 megaHertz. In order to preserve the chrominance signal, each field of the chrominance signal is separated from the luminance signal, compressed and stored in a field store memory while the luminance signal (of that field) is being recorded. Normally, the tape is helically wrapped by 180° around the drum and each field is recorded on the tape by one of a pair of heads as the drum rotates through 180°. In accordance with the invention, the video tape is overwrapped around the drum periphery by 20% or more beyond 180° (e.g., by 216°). The one head records a field of the incoming luminance signal as it rotates from 0° to 180° with the drum, while the unrecorded chrominance signal is being stored in memory. At the conclusion of this video field, the one head records the compressed chrominance signal as it rotates past 180° (e.g., from 180° to 216°) while, simultaneously, the other head begins recording the luminance signal of the next video field.

The invention is particularly adapted to the industry standard 8 mm video cassette recording format, which requires a tape overwrap angle of around 216°. Because the chrominance signal is recorded by itself in the present invention, the luminance signal is not present to provide the usual AC bias, and therefore the chrominance signal must be converted to an FM signal prior to recording.

In accordance with the invention, the audio signal (which in the prior art is recorded in a frequency band lying between the luminance frequency band and the color-under chrominance frequency band) is preferably moved to a lower-frequency band (just above the tracking pilot frequency band), thus clearing a previously unavailable band of frequencies lying between 0.7 megaHertz and 2.2 megaHertz for recording the luminance signal. The invention thus increases the luminance bandwidth by at least 1 megaHertz and by as much as 1.5 megaHertz. Because the luminance signal contains the most important information with regard to image resolution, and because the chrominance signal is of comparatively less importance with respect to image resolution, the overall effect is to provide a significant increase in overall playback image image resolution with respect to prior art video recording techniques.

BRIEF DESCRIPTION OF THE DRAWINGS

The invention may be understood by reference to the accompanying drawings, of which.

DETAILED DESCRIPTION

Figure 1A:
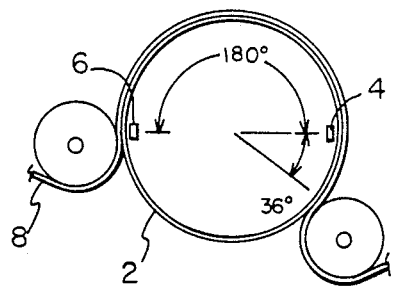
FIG. 1(a, b) illustrates the apparatus and process of video recording in accordance with the present invention.
Figure 1B:
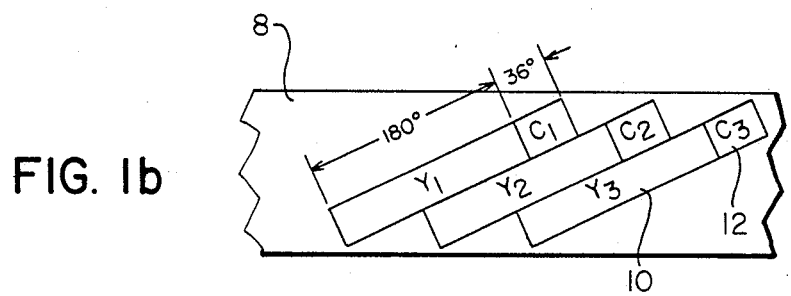

Referring to FIG. 1a, a rotating drum 2 supporting two video recording heads 4, 6 has a video tape 8 helically wrapped around its periphery. The heads 4, 6 are mutually displaced by 180° along the drum periphery. The heads 4, 6 record the odd and even fields, respectively, of an incoming video signal in successive tape tracks 10 illustrated in FIG. 1b during each 180° rotation of the drum 2. Thus, the tape must be wrapped around at least 180° of the drum periphery.

In accordance with the invention, the tape 8 is helically "overwrapped" around the drum 2, meaning that the tape is wrapped around more than 180° of the drum periphery. In the example of FIG. 1a, the tape is wrapped by over 36° beyond the usual 180° wrap for a total tape wrap slightly in excess of 216°. (This corresponds to the industry standard 8 mm video cassette recording specifications.) Each track 10 is scanned by one of the heads 4, 6 as the drum rotates by 180°. During the next 36° of drum rotation, the same head scans an extended portion 12 of the track 10.

Prior Art Video Recording

Figure 2A:
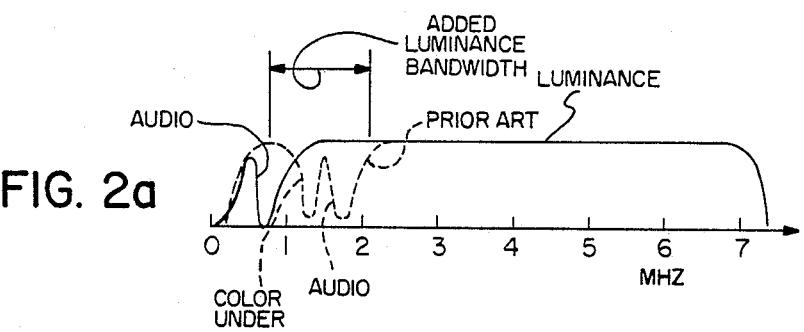
FIG. 2(a, b) illustrates the frequency distribution of recorded video signals in accordance with the present invention.

Referring to the dashed line graph of FIG. 2a, the luminance signal Y is typically recorded in a frequency band extending from about 2 megaHertz to 7 megaHertz. The chrominance signal is down converted and recorded in a "color-under" band lying between 0.5 and 1.3 megaHertz. The FM audio signal is recorded in a frequency band lying between the luminance frequency band and the color-under chrominance frequency band. Although the magnetic tape 8 of FIG. 1 is perfectly capable of recording a luminance bandwidth extending from 0.5 to over 7 megaHertz, the luminance band must be cut off below about 2 megaHertz, as illustrated in FIG. 2a in dashed line, in order to make room for the FM audio signal and the color-under chrominance signal.

A clear separation must be maintained between the luminance band, the chrominance band and the audio band, as illustrated in dashed line of FIG. 2a. Thus, the bandwidth of the luminance signal is significantly reduced in order to accommodate the chrominance and audio signals. This significantly limits the resolution of the playback video image.

Overwrap Recording of the Chrominance Signal

This limitation is overcome in accordance with the invention by separating the baseband chrominance components (R-Y, B-Y, or I, Q) from the luminance signal and recording each field of the luminance signal by itself on the tape 8. Each video field of one of the separated baseband chrominance components is stored while the corresponding luminance signal of the same field is being recorded in one of the tracks 10. Thereafter, the stored chrominance component (I or Q) is time-compressed by the ratio 180°/36°, converted to FM (see FIG. 2b) and transmitted to one of record heads 4, 6 as that one head scans one of the extended track portions 12. During the next video field, the other chrominance component is recorded similarly. This may be through of as field sequential color recording in which alternate fields of I and Q are sequentially recorded. In another embodiment of the invention, the color recording may be performed line sequentially. During playback, the sequentially skipped portions of the color signal may be "filled-in" to reconstruct an NTSC-type video signal by using a line-store or field-store memory, in the well-known manner.

The audio signal may be either (1) recorded in the main track portion 10 on a 0.5MHZ carrier as in FIG. 2a or (2) may be compressed and recorded in every other one of the extended track portions 12 (alternate fields of the chrominance signal being recorded in the remaining ones of the extended track portions 12).

Figure 2B:
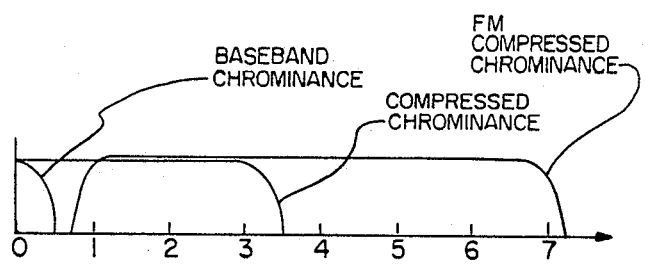

The playback decompressed chrominance signal bandwidth (dashed line) is about 1/5 (i.e. 36°/180°) of the compressed chrominance bandwidth (FIG. 2b). However, because the chrominance information is of comparatively small significance in determining overall playback video image resolution, this reduction in playback chrominance bandwidth is overridden in importance by the dramatic gain in luminance bandwidth illustrated in solid line in FIG. 2a. Note that in FIG. 2a, with the elimination of both the color-under chrominance signal and the audio signal from the main track portion 10, the luminance bandwidth is increased by about 1.0 megaHertz, a dramatic improvement.

The audio bandwidth may be reduced from that normally used in profession or industrial applications where voice grade audio bandwidth is sufficient.

Figure 3:
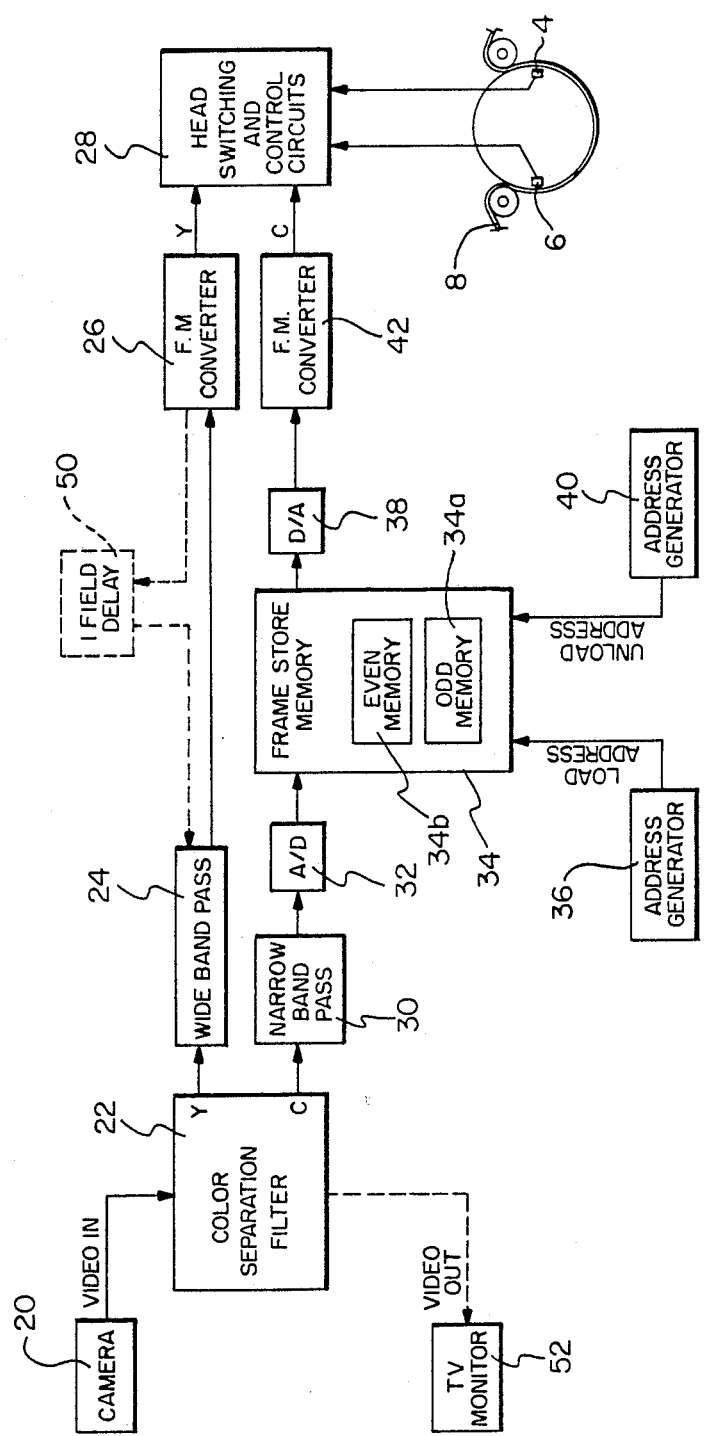
FIG. 3 is a block diagram illustrating a system for controlling the recording apparatus of FIG. 1 in accordance with the present invention.

Referring to FIG. 3, a camera-recorder ("camcorder") system embodying the invention includes a video camera 20 transmitting a color video signal to a color separation filter 22 having a luminance output (Y) and a chrominance output (C). In one embodiment of the invention, the color separation filter 22 includes means for field sequentially transmitting alternate ones of the two baseband chrominance components I and Q (or, equivalently, R-Y and B-Y) during alternate video fields at its chrominance output. (In another embodiment, the filter 22 transmits the two baseband components I and Q line sequentially at its chrominance output.) This feature advantageously reduces the required bandwidth for recording the chrominance signal.

The luminance output is applied through a wideband-pass filter 24 to a converter 26. The frequency response of the wide band pass filter 24 corresponds to the solid line of FIG. 2a. The converter 26 converts the luminance signal to an FM luminance signal and transmits it to head switching and control circuits 28 for recording on the magnetic tape 8 by the heads 4, 6. The head switching control circuits 28 are of the type well-known in the art.

The chrominance output of the color separation filter 22 is applied through a narrow-band-pass filter 30 to an analog-to-digital converter 32. The frequency response of the narrow-band-pass filter 30 corresponds to the dashed line of FIG. 2b. The analog-to-digital converter 32 converts the chrominance signal into a digital signal and transmits it to a frame store memory 34.

The frame store memory 34 includes an odd memory 34a and an even memory 34b. Each digital word of an odd or even video field transmitted by the analog-to-digital converter 32 is stored in the odd or the even memory 34a, 34b, respectively, in a unique location determined by the time of arrival of the digital word. This unique memory location is specified by a load address word transmitted to the frame store memory 34 by a load address word generator 36.

All data stored during one video field in the frame store memory 34 is unloaded during the next video field and transmitted to a digital-to-analog converter 38. This data is unloaded from the frame store memory 34 in an order established by a succession of unload address words transmitted to the frame store memory by an unload address word generator 40. Preferably, data is loaded and unloaded in the frame store memory 34 in the same order. The digital-to-analog converter 38 converts the unloaded digital data to an analog chrominance signal, which is then converted to an FM chrominance signal by a converter 42 and transmitted to the head switching and control circuits 28 for recording on the tape 8. The circuits 28 apply this chrominance signal (of the previous video field) to whichever of the two heads 4, 6 is presently scanning an extended track portion 12, while applying the luminance signal of the present video field to the other of the two heads 4, 6.

Figure 4A:
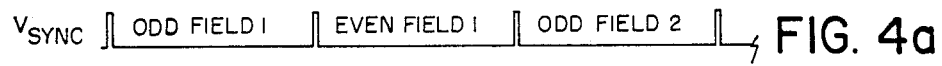
FIG. 4 (a–d) illustrates various signals controlling the system of FIG. 3.
Figure 4B:
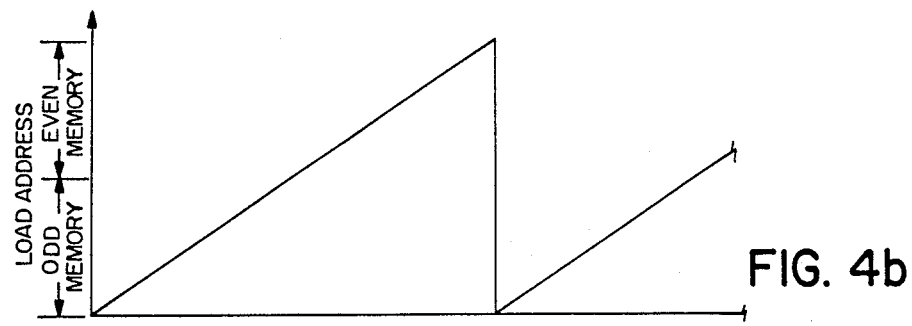
Figure 4C:
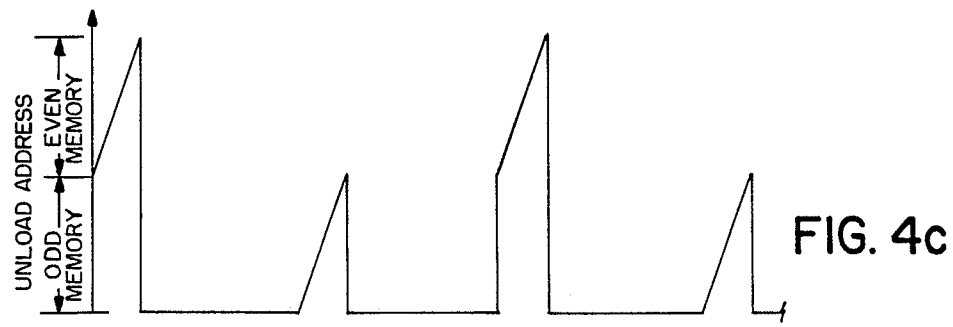
Figure 4D:
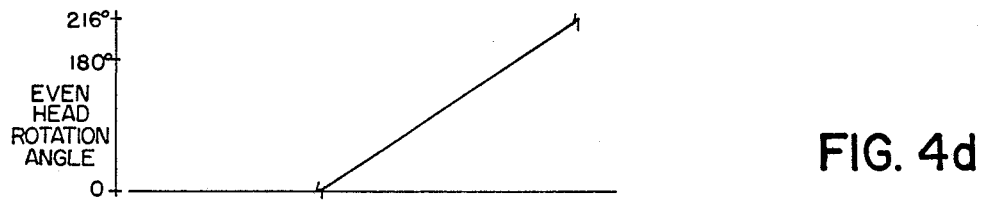

As described previously in connection with FIG. 1, the chrominance signal must be stored and compressed in order to fit within the relatively short extended track portion 12. The chrominance signal is compressed as follows. Referring to Fig. 4, the load addresses (FIG. 4b) generated by the load address generator 36 consecutively invoke the address locations of the odd or even memories 34a, 34b with the occurrence of the odd and even video fields, respectively, in synchronism with the V-sync signal of FIG. 4a. Referring to FIG. 4c, each field of the chrominance signal is unloaded from the memory 34 at a rate approximately five times greater (i.e., 180°/36°) than that at which it was previously loaded. Thus, during odd field 1 of FIG. 4a, the load address signal specifies a chronological progression of address locations in the odd memory 34a until it is filled with a complete set of chrominance data representing the odd field 1 of chrominance signal. At the conclusion of odd field 1, the unload address signal of FIG. 4c specifies the same progression of address locations in the odd memory 34a for unloading, but at a faster rate, so that the odd memory 34a is unloaded in about 1/5 the time that it took to load it during field 1. Similarly, at the end of even field 1, the even field memory 34b has been filled with data representing the even field chrominance signal in a progression of memory locations specified by the load address signal. Thereafter, the unload address signal causes the even field chrominance signal to be fetched from the even field memory 34b at the faster rate. Referring to FIG. 4d, each unloading operation takes place during rotation of a corresponding one of the heads 4, 6 through the overwrap angle from 180° to 216° (or from 0° to 36°), facilitating the recording of the unloaded chrominance signal by that head in a corresponding one of the extended track portions 12.

During playback, the foregoing process is essentially repeated in reverse using the elements illustrated in FIG. 3. Thus, a playback video signal is transmitted from the heads 4, 6 to the head switching and control circuits 28. The head circuits 28 maintain separation between the luminance and chrominance signals by simply transmitting the playback signal from each head to the luminance FM converter 26 only during head rotations from 0° to 180° (or 180° to 360°), and to the chrominance FM converter 42 only during head rotations from 180° to 216° (or 0° to 36°). The playback chrominance signal is then loaded into the frame store memory 34 in accordance with the addressing sequence of FIG. 4c and is then unloaded in accordance with the addressing sequence illustrated in FIG. 4b. Note, however, that the chrominance signal unloaded from the frame store memory 34 is delayed by the one field with respect to the luminance signal. This timing difference is rectified by providing a delay 50 in the path of the playback luminance signal, which delays the luminance signal by one field during playback. The delay 50 may be a frame store memory or the like. The playback luminance and chrominance signal are then combined in the filter 22 and transmitted to an external TV monitor 52, for example.

While the invention has been described in detail with particular reference to preferred embodiments thereof, it is understood that variations and modifications can be made within the spirit and scope of the invention.

What is claimed is:

1. A video cassette recorder having a drum assembly mounting a pair of heads and adapted to record on a video tape successive video fields during successive drum rotations through an angle $\theta$ by successive ones of the two heads, said recorder comprising:
    means for wrapping said video tape through an angle $\theta + \phi$ around said drum;
    means for separating an incoming video signal into luminance and chrominance signals characterized by a luminance frequency band and a first chrominance frequency band, respectively;
    means for recording one field of said luminance signal through one of said heads during the drum rotation through said angle $\theta$ whereby successive fields of said luminance signal are recorded on successive parallel main tracks on said tape;
    means for storing a corresponding field of said chrominance signal during said drum rotation through said angle $\theta$; and
    means for unloading said corresponding chrominance field from said storing means, frequency modulating it and recording it through said one head during a following drum rotation through said angle $\phi$ so that said chrominance signal of said corresponding field is recorded in a corresponding overscanned track on said tape, wherein prior to being recorded, said chrominance field is time compressed by said unloading means by a ratio of about $\theta/\phi$ and frequency modulated so as to be characterized by a second chrominance frequency band wider than said first chrominance frequency band, wherein said first chrominance frequency band is smaller than said luminance frequency band while said second chrominance frequency band is at least nearly co-extensive with said luminance frequency band, whereby the recorded bandwidth of said luminance signal is virtually unrestricted by the bandwidth of said chrominance signal.

2. The video recorder of claim 1 wherein said incoming video signal is accompanied by an audio signal, and wherein said audio signal is recorded with said luminance signal during said drum rotations through angle $\theta$ in a frequency band of around 0.4 megaHertz, wherein said bandwidth of said luminance signal lies in a range of between 1 and 7 megaHertz.

3. The video recorder of claim 1 wherein said incoming video signal is accompanied by an audio signal, and wherein said audio signal is compressed and recorded with said chrominance signal during said drum rotations through angle $\phi$.

4. The video recorder of claim 1 wherein:
    said storing means comprise:
        a memory including odd and even memory portions;
        means for loading, respectively, odd and even fields of said chrominance signal into said odd and even memory portions during corresponding drum rotations through angle $\theta$ at one data rate; and
    said unloading means comprise:
        means for unloading from said storing means said odd and even chrominance fields during corresponding drum rotations through angle $\theta$ at a data rate equal to said one data rate multiplied by $\theta/\phi$.

5. The recorder of claim 1 wherein said recorder is an 8 mm video cassette recorder, $\theta$ is about 180° and $\phi$ is about 36°.

6. The video recorder of claim 1 wherein said recorder is further adapted to playback previously recorded video signals, said recorder further comprising:
    switching means for receiving a playback signal from said head-drum assembly and for transmitting successive fields of said previously recorded luminance signal during rotations of said drum through angle $\theta$ and for transmitting previously recorded fields of said chrominance signal during rotations of said drum through angle $\theta$ to said chrominance signal storing means, wherein said chrominance signal storing means unloads successive fields of said previously recorded chrominance signal during successive rotations of said drum through angle $\theta$ whereby said chrominance signal is decompressed and is combinable with said luminance signal.

7. The recorder of claim 6 further comprising means for delaying by the interval of one video field said luminance signal, whereby corresponding fields of said luminance and chrominance signal are temporarily aligned during playback.

8. In a video cassette recorder having a head-drum assembly adapted to record on a video tape successive video fields of a color video signal during successive drum rotations through an angle $\theta$, and wherein said tape is wrapped around said drum through an angle $\phi+\theta$, the improvement comprising:
 means for separating said color video signal into a luminance signal characterized by a luminance frequency band and a chrominance signal characterized by a first chrominance frequency band;
 means for storing successive fields of said chrominance signal whereby only said luminance signal is recorded by one of said heads during successive drum rotations through said angle $\theta$ and whereby successive fields of said luminance signal are recorded on successive parallel main tracks on said tape; and
 means for unloading said successive chrominance field from said storing means, frequency modulating them and successively transmitting said chrominance fields to said one head during successive drum rotations through said angle $\phi$ so that said chrominance signal of said corresponding field is recorded in a corresponding overscanned track on said tape, wherein prior to being recorded, each of said chrominance fields is time compressed by said unloading means by a ratio of about $\theta/\phi$ and frequency modulated so as to be characterized by a second chrominance frequency band wider than said first chrominance frequency band wherein said first chrominance frequency band is smaller than said luminance frequency band while said second chrominance frequency band is at least nearly co-extensive with said luminance frequency band, whereby the bandwidth of said luminance signal is virtually unrestricted by the bandwidth of said chrominance signal.

9. The video recorder of claim 8 wherein said incoming video signal is accompanied by an audio signal, and wherein said audio signal is recorded with said luminance signal during said drum rotations through angle $\theta$ in a frequency band of around 0.4 megaHertz, wherein said bandwidth of said luminance signal lies in a range of between 2 and 7 megaHertz.

10. The video recorder of claim 8 wherein said incoming video signal is accompanied by an audio signal, and wherein said audio signal is compressed and recorded with said chrominance signal during said drum rotations through angle $\theta$.

11. The video recorder of claim 8 wherein:
 said storing means comprise:
 a memory including odd and even memory portions;
 means for loading, respectively, odd and even fields of said chrominance signal into said odd and even memory portions during corresponding drum rotations through angle $\theta$ at one data rate; and
 said unloading means comprise:
 means for unloading from said storing means said odd and even chrominance fields during corresponding drum rotations through angle $\theta$ at a data rate equal to said one data rate multiplied by $\theta/\phi$.

12. The recorder of claim 8 wherein said recorder is an 8 mm video cassette recorder, $\theta$ is about 180° and $\phi$ is about 36°.

13. The video recorder of claim 8 wherein said recorder is further adapted to playback previously recorded video signals, said recorder further comprising:
 switching means for receiving a playback signal from said head-drum assembly and for transmitting successive fields of said previously recorded luminance during rotations of said drum through angle $\theta$ and for transmitting previously recorded fields of said chrominance signal during rotations of said drum through angle $\theta$ to said chrominance signal storing means, wherein said chrominance signal storing means unloads successive fields of said previously recorded chrominance signal during successive rotations of said head through angle $\theta$ whereby said chrominance signal is decompressed and is combinable with said luminance signal.

14. The recorder of claim 13 further comprising means for delaying by the interval of one video field said luminance signal, whereby corresponding fields of said luminance and chrominance signal are temporally aligned during playback.

* * * * *